April 28, 1942.    G. E. BULLOCK    2,281,229
NOZZLE CONSTRUCTION
Filed June 2, 1941
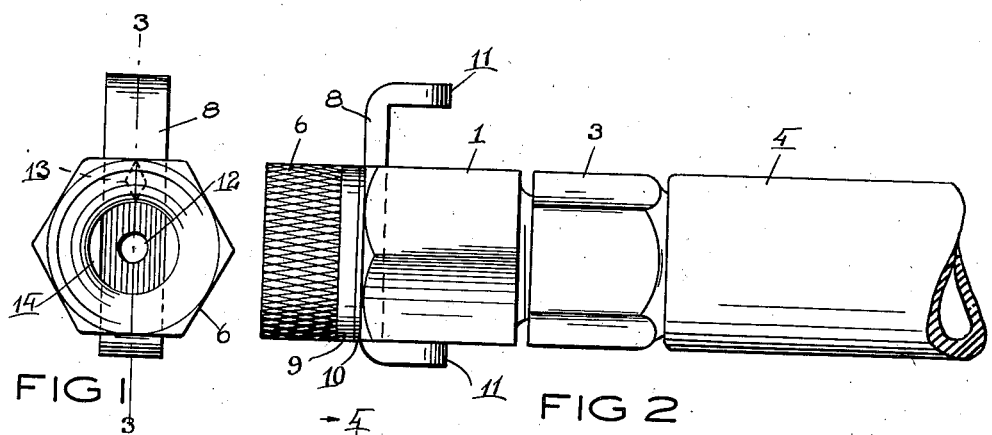
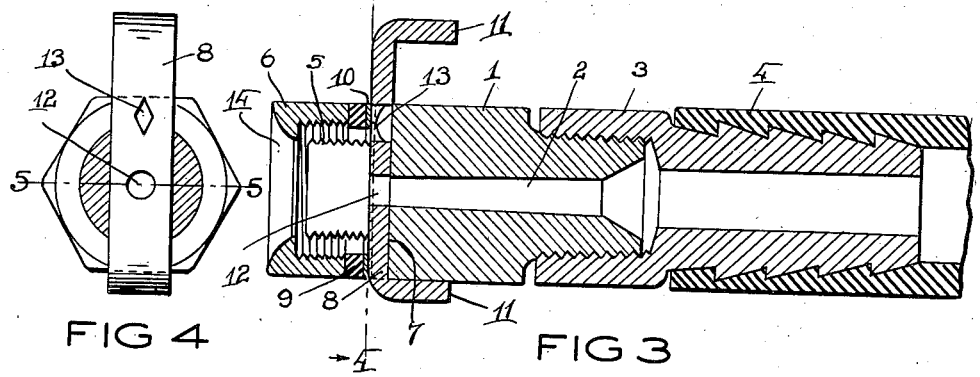
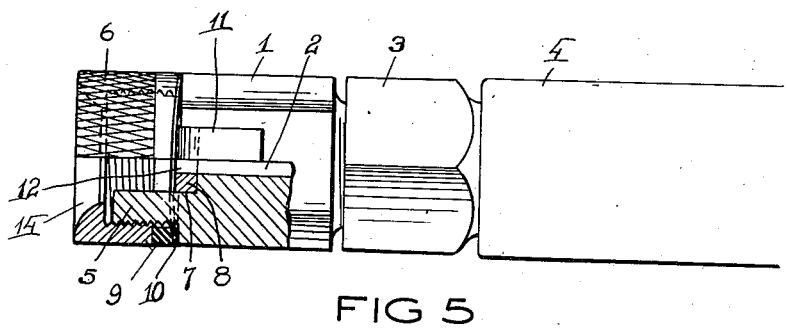
INVENTOR
GILES E. BULLOCK
BY
ATTORNEY Patented Apr. 28, 1942

2,281,229

UNITED STATES PATENT OFFICE 2,281,229

NOZZLE CONSTRUCTION

Giles E. Bullock, Rochester, N. Y.

Application June 2, 1941, Serial No. 396,250

7 Claims. (Cl. 299—139)

This invention relates to nozzles adapted for attachment to the end of a hose and has for its principal object to provide valve means in the nozzle whereby a solid stream of liquid thrown a considerable distance may be instantaneously changed into a spray thrown but a short distance.

A further object of this invention is to provide the nozzle with a novel form of valve structure in which the pressure of the valve member against the value seat may be varied so that it can be increased to a point where it serves to hold the valve member in a substantially fixed position or decreased to permit a quick movement of the valve member to produce either a solid stream or a spray.

Another object of this invention is to provide a novel valve construction with a novel mounting for the sliding valve member which eliminates leakage between the valve seat and the valve member.

Still another object of this invention is to provide the valve structure of the nozzle with a bearing member operating against the flat valve member to reduce the frictional resistance between the valve member and the valve seating means.

All these and other objects and attendant advantages of this invention will become more readily apparent from the detailed description thereof which follows, reference being had to the accompanying drawing in which Figure 1 is a front elevation of the nozzle embodying my invention.

Figure 2 is a side elevation thereof.

Figure 3 is a longitudinal sectional view of the nozzle taken on the line 3—3 in Figure 1.

Figure 4 is a vertical sectional view of the nozzle taken on the line 4—4 in Figure 3.

Figure 5 is a top plan view of the nozzle with a portion of it illustrated in section.

The nozzle construction forming the subject matter of my present invention is adapted to throw a solid stream of liquid over a long distance and a fine mist or spray over a short distance and provides in its operation for an almost instantaneous change from the solid long distance stream to the short distance spray. Furthermore the novel construction provides for a one way movement of the valve member in such a manner that the direction of the solid stream and subsequent spray will not be changed by the simple manipulation of the valve member.

As illustrated in the figures of the drawing, the nozzle construction comprises the valve body 1 of preferably hexagonal cross section which has the valve duct 2 extending centrally therethru. The rear of the valve body is suitably threaded for threaded engagement into the hose connection 3 for attachment to the end of the flexible hose 4.

The forward end of the valve body 1 is provided with a threaded extension 5 of reduced diameter which has the nozzle cap 6 threaded thereto. The threaded extension and the valve body are slotted diagonally to a predetermined depth in the valve body so as to provide a channel shaped valve seat 7 across the end of the valve duct 2. The valve member 8 is mounted to slide in the valve channel of the valve body and is yieldingly held against the valve seat. For this purpose a compressible washer 9 and a metal washer 10 surround the threaded extension 5 of the valve body so that the nozzle cap, when threaded onto the extension, will compress the washer 9 and yieldingly force the washer 10 against the valve member 8 in the end portions of the valve channel which extend beyond the threaded extension 5. Yielding pressure is thus applied at diametrically opposite points on the valve member and to make this most effective the thickness of the valve is slightly greater than the depth of the valve channel in the valve body proper. The valve member thus projects above the valve channel where it contacts the holding washer 10 to thus permit varied pressure to be exerted against the valve member. The compressible washer 9 is preferably a rubber washer which, when forced against the washer 10, causes the latter to yieldingly transmit its pressure against the contacting portions of the valve member and bend the washer over the edges of the valve member intermediate these contacting portions. The valve member is thus firmly held in a straight line motion in the valve channel and by increasing or decreasing the compression of the washer 8 by means of the nozzle cap, the valve member may be made to move on its valve seat with increased or decreased frictional contact. In this way the valve member may be held substantially fixed in the valve body or it may be made to slide very easily for quick movement if this is desired. In either case the valve member by its double contact with a pressure exerting member is held in uniform frictional contact over its entire engagement in the valve channel and thus prevents leakage between the contacting surfaces of the valve member and the valve seat.

While I have shown and described the compressible washer 8 as being of rubber, other compressible materials may be used for the washer, or the washer may even be replaced by a suitable spring. Furthermore the metal washer 10, instead of being thin and flexible as described above, may be made heavier and rigid so as not to flex over the edges of the valve member when forced thereagainst. In either case the washer serves as a bearing member which reduces frictional resistance with the back of the valve member to a minimum and provides a wear resisting bearing surface which keeps the valve member properly seated at all times.

Each end of the valve member 8 is bent at right angles thereto to provide suitable push buttons 11, 11 with which the valve member can be readily forced back and forth in the valve body. The inside of these push buttons serve as stop members which limit the movement of the valve member to bring either the large round hole 12 or the restricted oblong hole 13 in alignment with the end of the valve duct 2.

With the large round hole 12 in register with the valve duct, a solid stream will issue from the valve member and pass unobstructedly thru the opening 14 in the nozzle cap 6; and with the oblong and restricted substantially diamond shaped opening 13 in register with the valve duct, the nozzle produces the desired mist spray that will be thrown over a reduced distance.

From the foregoing it will be apparent that the present invention provides a novel nozzle structure in which the valve member may be operated to almost instantaneously change the flow from the nozzle from a long distance solid stream to a short distance fan spray. The nozzle structure, furthermore, embodies a novel valve member and valve seat with combined operating and movement limiting means for the valve member including movement regulating means which insure proper operation of the nozzle without leakage.

I claim:

1. A nozzle construction comprising a valve body having a duct therethru, a valve seat extending transversely across said valve body and its duct, a valve member mounted to slide on said valve seat and projecting from the side of said valve body for movement thereof, a cap movable endwise on said valve body and having an opening in the end thereof in line with said duct, and compressible means interposed between said cap and said valve member, said valve member having at least one opening therethru for alignment with said valve duct and the opening in said cap by the movement of said valve member.

2. In a nozzle construction the combination of a valve body having a duct therethru, a cap threaded to one end of said valve body for endwise movement thereon, a valve seat extending transversely along one diameter of said valve body and duct, a valve member movable in said valve seat and projecting from the side of said valve body for movement thereof, and yielding means interposed between said cap and said valve member for sliding contact with the back of said valve member at points radially spaced from the center of said duct said valve member having at least one opening therethru for alignment with said valve duct.

3. In a nozzle construction the combination of a valve body having a duct therethru, a threaded extension on said valve body, a slot extending transversely of said extension into said valve body to provide a transversely extending valve seat across said duct, a valve member movable in said valve seat, a cap threaded on said extension, and yielding means surrounding said extension and interposed between said cap and said valve member over the ends of said valve seat in said valve member for sliding contact with the back of said valve member, said valve member having at least one opening therethru for alignment with said valve duct.

4. In a nozzle construction the combination of a valve body having a duct extending longitudinally therethru, a channel providing a valve seat transversely across the valve body and its duct, a valve member having a greater thickness than the depth of said channel mounted to slide endwise in said channel with its back projecting from the channel, and yielding means carried by said valve body for sliding engagement with the back of said valve member to yieldingly hold said valve member in place in said channel.

5. In a nozzle construction the combination as set forth in claim 4 in which the ends of said valve member move in and out of said valve body, and include means carried thereby for limiting the movement of said valve member in opposite directions.

6. A nozzle construction comprising a valve body having a duct extending longitudinally therethru, a channel shaped valve seat extending transversely of said valve body and diametrically across said duct, a valve slide movable on said valve seat with two of the opposing contacting surfaces forming a continuous substantially air and liquid tight joint between them, a bearing member contacting the back of said valve slide, and yielding means engaging said bearing member to yieldingly hold said valve slide in place on said valve seat, said valve slide having at least one opening therethru for alignment with said valve duct.

7. A nozzle construction as set forth in claim 6 including means for increasing and decreasing the pressure of said yielding means against said bearing member.

GILES E. BULLOCK.